(No Model.)
R. & A. HARTMANN & G. F. REINHARD.
BICYCLE ALARM.
No. 588,573. Patented Aug. 24, 1897.
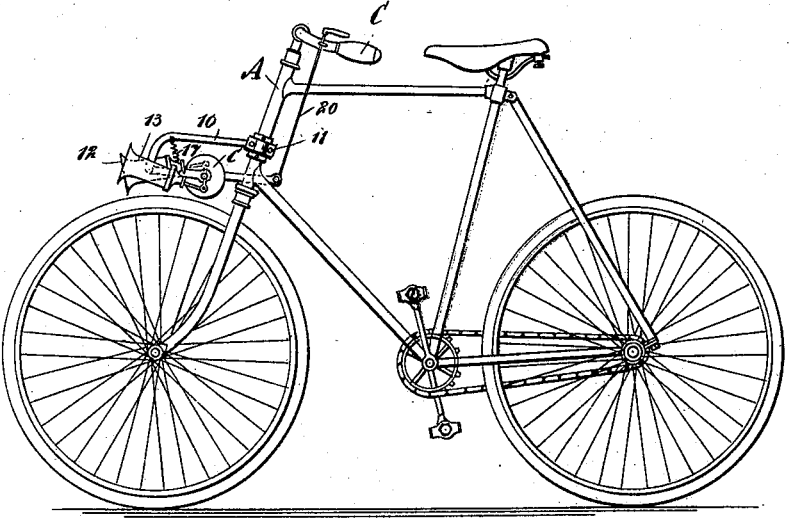
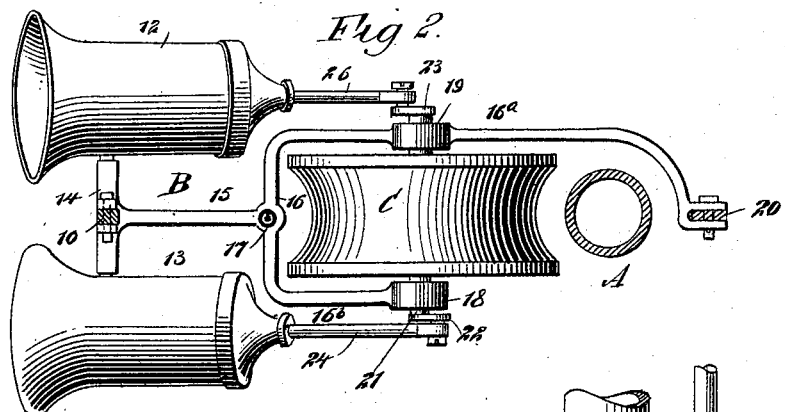
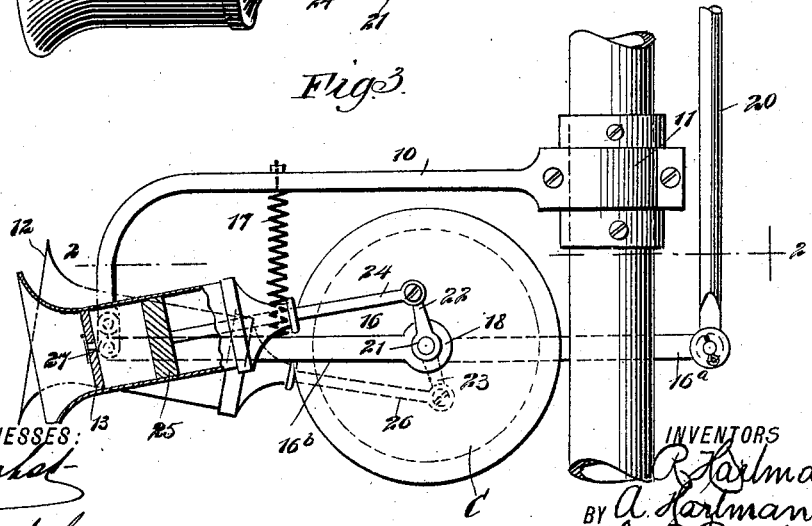
WITNESSES:
INVENTORS
R. Hartmann
BY A. Hartmann
G. F. Reinhard
ATTORNEYS.

UNITED STATES PATENT OFFICE.

RUDOLF HARTMANN, ALFRED HARTMANN, AND GEORGE F. REINHARD, OF JERSEY CITY, NEW JERSEY.

BICYCLE-ALARM.

SPECIFICATION forming part of Letters Patent No. 588,573, dated August 24, 1897.

Application filed July 30, 1896. Serial No. 601,030. (No model.)

*To all whom it may concern:*

Be it known that we, RUDOLF HARTMANN, ALFRED HARTMANN, and GEORGE F. REINHARD, of Jersey City, in the county of Hudson and State of New Jersey, have invented a new and Improved Musical Signal for Bicycles, of which the following is a full, clear, and exact description.

The object of our invention is to provide a signal which will be a substitute for the bell usually employed on bicycles to give warning of the approach of the machine, the said substitute being adapted to give forth a musical sound and being arranged for operation by the movement of the machine, the trumpets which are employed to give warning of the approach of the bicycle being especially adapted to be operated from the front or steering wheel of the machine, the trumpets and all parts connected therewith turning with the aforesaid steering-wheel.

A further object of the invention is to construct a device for giving a musical alarm which will be exceedingly simple, durable, and economic.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a bicycle having the improvement applied. Fig. 2 is a section taken substantially on the line 2 2 of Fig. 3, and Fig. 3 is a partial side elevation of the attachment and a partial sectional view of the same.

In carrying out the invention a hanger 10 is loosely mounted upon the head A of the bicycle through the medium of a sleeve 11, or its equivalent, held between two fixed collars on the head. The main portion of the hanger 10 is horizontally disposed and is carried forward over the front wheel of the machine, and its forward end is given a downward inclination. At each side of the hanger 10 a trumpet is located, (designated, respectively, as 12 and 13.) These trumpets are pivoted upon the cross bar or head 14 of a T-frame B, the shank portion 15 whereof is connected with the bow portion of a yoke 16, and the head-section of the T-arm 15 has a pivotal connection with the lower forward end of the hanger 10, and a spring 17 is attached to the bow-section of the yoke 16 and to the hanger 10, normally holding the yoke in a slight upward position.

The side members of the yoke are in different lengths, the outer member 16$^a$ being much longer than the inner member 16$^b$, and the said longer or outer member of the yoke is carried rearwardly and is usually curved around the rear of the head A of the bicycle-frame, as shown in Fig. 2. The rear end of the shorter member 16$^b$ of the yoke terminates in a bearing 18, and a similar bearing 19 is formed opposite the bearing 18 in or upon the longer member 16$^a$ of the yoke. The longer member of the yoke is pivotally connected with a push-bar 20 or any form of lever, and the said bar or lever is generally carried upward through a guide which is attached to the handle-bar C, as shown in Fig. 1, so that by pressing downward on the bar or lever 20 the yoke 16 will be forced downward in direction of the steering-wheel of the bicycle.

A shaft 21 is journaled in the bearings 18 and 19 of the yoke, and this shaft has a crank-arm 23 at one end and another crank-arm 22 at the opposite end, the cranks being oppositely disposed. Each trumpet 12 and 13 is in cylindrical form, having an open forward end and a substantially-closed rear end. The trumpet 13 is provided with a piston-rod 24, which is attached to the crank-arm 22 of the shaft 21, and the piston-rod 24 within the trumpet is provided with a piston 25, as shown in Fig. 3. The opposite trumpet 12 is provided with a like piston-rod 26, also carrying a piston, and the piston-rod 26 is pivotally attached to the crank-arm 23 of the shaft 21, and upon the said shaft 21, between the members of the yoke 16, a peripherally-grooved wheel C is mounted, and this wheel, when the yoke is pressed downward, will be brought in engagement with the tire of the steering-wheel of the machine and serve to operate the drive-shaft, and consequently the piston-heads in the trumpets 12 and 13, the spring 17 serving to normally hold the friction-wheel C out of engagement with the front wheel of the machine.

One or more reeds 27 are located in each trumpet, as shown in Fig. 3, the sounds being produced by the movement of the piston-heads in the trumpet-cylinders. The reeds 27 are supported each on a plate or diaphragm 27ª, (for one of which see Fig. 3.) These plates serve a dual function: (a) they support the reeds and form an air-emiting opening for the reed to cover and (b) they close the outer ends of the trumpets or cylinders 12 and 13 to prevent the entry of dust and the consequent pernicious effect on the pistons of the respective cylinders or trumpets. Under such a construction it is obvious that harmonious musical sounds can be produced to serve as a notice of the approach of or near vicinity of the bicycle, dispensing with the harsh and startling sound of the alarm-bell.

It will be understood that any instrument of a musical type capable of being operated by the compression or exhaustion of air may be used instead of the trumpets illustrated and that but a single trumpet or instrument may be used. It is also obvious that the alarm instrument will move with the front or steering wheel, owing to its connection with the handle-bar, but the push-bar or lever 20 may be otherwise located provided the same result is attained.

It will be understood that the tone produced by the attachment may be such as is expressed by an organ-pipe, an organ-reed, or a whistle, or their equivalents, and that all such sounds are sought to be included in the terms "musical tones." We also desire it to be understood that the air may be supplied otherwise than shown.

Having thus described our invention, we claim as new and desire to secure by Letters Patent—

1. A signal for vehicles, the signal having a brace adapted to be secured to the vehicle and extending outwardly over a wheel thereof, a frame having a T-shaped front portion, the middle portion of the T being pivotally connected to the forward end of the bracket, a trumpet pivoted to each end of the T, the rear portion of the frame being forked, a traction-wheel, the trunnions of which are respectively mounted in the arms of the fork, a crank-arm secured to each trunnion, a rod pivoted to each crank-arm, a piston movable in each trunnion-cylinder and respectively connected to the rods, one arm of the fork being extended rearward beyond the traction-wheel, a rod connected to said extended arm and serving to push the frame downward to engage the traction-wheel with the vehicle-wheel, and a spring normally holding the traction-wheel raised, substantially as described.

2. A signal for vehicles, the signal having a bracket capable of being secured to the vehicle and of extending over the wheel thereof, a frame pivoted to the bracket and hanging beneath the same, a retractile spring connected to the frame and to the bracket and normally lifting the frame, a wheel revolubly mounted in the frame and movable with the frame toward and from the wheel of the vehicle, a cylinder pivoted to the frame, a rigidly-connected piston and rod within the cylinder, the rod having cranked connection with the wheel of the frame, a reed within the cylinder and operated by the action of the piston therein, and means connected to the free end of the frame by which it may be depressed against the tension of the spring, substantially as described.

RUDOLF HARTMANN.
ALFRED HARTMANN.
GEORGE F. REINHARD.

Witnesses:
J. FRED. ACKER,
JNO. M. RITTER.